United States Patent [19]
Yamamoto et al.

[11] Patent Number: 5,928,976
[45] Date of Patent: Jul. 27, 1999

[54] COMPOSITE CARBIDE POWDER USED FOR CEMENTED CARBIDE AND METHOD OF PRODUCING THE SAME

[75] Inventors: Yoshiharu Yamamoto; Nobuaki Asada, both of Toyama; Yoshihiko Doi, Tokyo, all of Japan

[73] Assignee: Tokyo Tungsten Co., Ltd., Tokyo, Japan

[21] Appl. No.: 08/859,228

[22] Filed: May 19, 1997

[30] Foreign Application Priority Data

May 21, 1996 [JP] Japan .................................. 8-125537

[51] Int. Cl.$^6$ .................................................. C01B 31/34
[52] U.S. Cl. ................. 501/87; 501/93; 423/440
[58] Field of Search ................. 501/87, 93; 423/440; 419/15; 75/240, 241

[56] References Cited

U.S. PATENT DOCUMENTS

| | | | |
|---|---|---|---|
| 3,480,410 | 11/1969 | Hummer | 419/15 |
| 4,950,328 | 8/1990 | Odani et al. | 75/240 |
| 5,061,661 | 10/1991 | Moyle et al. | 501/87 |

FOREIGN PATENT DOCUMENTS

| | | |
|---|---|---|
| 4011972 | 10/1991 | Germany . |
| 3208811 | 9/1991 | Japan . |
| 5147916 | 6/1993 | Japan . |

OTHER PUBLICATIONS

Abstract for JP 5–147916, Jun. 15, 1993.
Patent Abstracts of Japan, vol. 017, No. 533 (C–1114), Sep. 27, 1993.
Database WPI, Seciton Ch. Week 8009 Derwent Publications Ltd., London, GB, Jan. 31, 1980.

*Primary Examiner*—Melissa Koslow
*Attorney, Agent, or Firm*—Sughrue, Mion, Zinn, Macpeak & Seas, PLLC

[57] ABSTRACT

In order to provide cemented carbide, provision is made about tungsten carbide powder which has a grain size not smaller than 1 $\mu$m and which is mixed with carbon powder and chromium powder to form raw powder. The tungsten carbide powder is formed by fine primary crystal particles of tungsten carbide and satisfies an inequality given by:

$$Y > 0.61 - 0.33 \log(X),$$

where Y denotes a half-value width of (211) crystal planes in tungsten carbide (JCPDS-card 25-1047, d=0.9020) measured by a X-ray diffraction method and where X denotes a grain size measured by the FSSS method. There is also provided a method of producing the composite carbide powder having tungsten carbide powder as a main element, the method comprising the steps of preparing tungsten powder which has a mean grain size not smaller than 1 $\mu$m, mixing the tungsten powder with carbon powder and chromium powder into a mixture, and processing the mixture in a predetermined atmosphere into fine primary crystal particles of tungsten carbide. One or more of the following additional components may be added to the mixture: Ta, Mo, Nb and Zr.

15 Claims, No Drawings

COMPOSITE CARBIDE POWDER USED FOR CEMENTED CARBIDE AND METHOD OF PRODUCING THE SAME

BACKGROUND OF THE INVENTION

The present invention relates to a composite carbide powder which serves as a raw material of cemented carbide, namely, hard metal and, more particularly, to the composite carbide powder of a tungsten carbide (WC) series. In addition, the present invention further relates to a method of producing the composite carbide powder.

Heretofore, a composite carbide powder is used to produce a wide variety of tools, such as an end mill, a reamer, a shear blade, and the like, to shear or shape an object. As such a composite carbide powder, WC—Co based cemented carbide has been disclosed in Japanese Unexamined Patent Publications Nos. Hei 3-208811 (namely, 208811/1991) and Hei 5-147916 (namely, 147916/1993) both of which will be referred to as first and second references, respectively. As mentioned in both the first and the second references, WC powder which has a mean grain size of 0.5 $\mu$m or less is at first prepared as a raw material. To the WC powder, 0.1 to 2.0% of V, 0.1 to 2% of Cr, and 0.2 to 3% of Ta are added by weight as an inhibiter of grain growth. In addition, the cemented carbide further comprises, by weight, 5 to 30% of Co or Ni and impurities and has a structure specified by a WC phase of 0.8 $\mu$m or less.

Recent demand has been strongly directed to an automatic shear process or an automatic shaping process. In such an automatic shear or shaping process, tools of cemented carbide have been exposed to very strict conditions. In order to endure such strict conditions, it is thought that the tools should be formed by fine-grain cemented carbide.

However, most of fine grain WC powders are practically liable to be easily carburized at a low temperature of 1300° C. or less and are therefore unstable. As a result, grain growth readily occurs during a heat treatment of the cemented carbide. This means that a metallographic structure of a WC phase in the cemented carbide is adversely affected by wide distribution of grain sizes. Therefore, large-size particles have a defect which results in a reduction of strength in the cemented carbide. This makes it difficult to fulfill the requirements for the tools.

In order to produce WC powder with a grain size of 1 $\mu$m or less, W powder should also have a fine grain size of 1 $\mu$m or less.

Such W powder of a fine grain size is very expensive in comparison with W powder of 1 $\mu$m or more and makes the cemented carbide expensive.

SUMMARY OF THE INVENTION

It is an object of the present invention to provide a composite carbide powder which is capable of making fine grain cemented carbide without using fine grain tungsten (W) powder.

It is another object of the present invention to provide a tool which is formed by the composite carbide powder.

It is still another object of the present invention to provide a method of producing the composite carbide powder above-mentioned.

According to this invention, there is provided a composite carbide powder comprising, as a main component, tungsten carbide powder which consists essentially of fine primary crystal particles of tungsten carbide, wherein the tungsten carbide powder satisfies an inequality given by:

$$Y > 0.61 - 0.33 \log (X),$$

where Y denotes a half-value width of (211) crystal planes in the tungsten carbide (JCPDS-card 25-1047, d=0.9020) measured by an X-ray diffraction method and where X denotes a grain size measured by a FSSS method.

According to this invention, there is also provided a method of producing a composite carbide powder having tungsten carbide powder as a main element, the method comprising the steps of preparing tungsten powder which has a mean grain size not smaller than 1 $\mu$m, mixing the tungsten powder with carbon powder and chromium powder into a mixture, and processing the mixture in a predetermined atmosphere into fine primary crystal particles of tungsten carbide as the composite carbide powder.

According to this invention, there is also provided a method of producing a composite carbide powder having tungsten carbide powder as a main element, the method comprising the steps of preparing tungsten powder which has a mean grain size not smaller than 1 $\mu$m, mixing the tungsten powder with carbon powder and chromium powder together with at least one component selected from a group consisting of Ta, Mo, Nb, and Zr to form a mixture; and processing the mixture in a predetermined atmosphere into fine primary crystal particles of tungsten carbide as the composite carbide powder.

DESCRIPTION OF THE PREFERRED EMBODIMENT

Description will be made as regards an embodiment of the present invention.

In the present invention, provision is made about W powder and carbon (C) powder. In this event, it is to be noted in the embodiment of the present invention that the W powder has a mean grain size between 1.0 and 7.0 $\mu$m and does not include a fine grain size less than 1 $\mu$m. In addition, a chromium containing material or powder (will be called Cr powder) is also prepared which is selected from a group consisting of metal chromium, chromium oxide, organic chromium compound, inorganic chromium compound, and chromium carbide. In the example, vanadium powder which may be selected from vanadium oxide, vanadium metal, and vanadium carbide is also prepared together with additional powder formed by oxide, metal or carbide of at least one component of Ta, Mo, Nb, and Zr. Then, the W powder, the C powder, the Cr powder, the vanadium powder and the additional powder are thus prepared as a raw material or raw powder and mixed together to form a mixture.

The mixture is introduced into an atmosphere selected from a hydrogen atmosphere, a vacuum atmosphere, and an inert gas atmosphere, such as nitrogen ($N_2$) and argon (Ar) and heated to obtain fine primary crystal particles of tungsten carbide. Specifically, the mixture is heated at a heating rate between 3 and 100° C./min to a temperature between 1200 and 1700° C. to be kept at the temperature for 10 to 300 minutes (preferably, 200 minutes) in the above-mentioned atmosphere. During the heat treatment, the mixture is carburized into a composite carbide powder which includes the fine primary crystal particles of the tungsten carbide (WC).

It has been confirmed that the fine primary crystal particles thus obtained satisfy an inequality of Y>0.61–0.33 log X, where X denotes a grain size which is measured by the FSSS method and which has a mean grain size of 1 $\mu$m or more and Y denotes a half-value width of (211) crystal planes in tungsten carbide (JCPDS card 25-1047, d=0.9020) measured by an X-ray diffraction method.

In addition, it has been found out that the obtained composite carbide powder is formed by fine cemented carbide grains with a homogeneous mean grain size. This shows that the fine cemented carbide grains can be attained without fine WC powder which has a grain size of 1 μm or less when it is measured by FSSS method. This shows that the fine cemented carbide grains can be cheaply obtained with this method.

Herein, consideration will be made about the reasons of limitations.

In the present invention, a mean grain size of the W powder is restricted to a range between 1.0 and 7.0 μm. When the grain size is smaller than 1.0 μm, a grain size of W is too small to diffuse Cr into a W grain to produce a fine primary crystal of WC.

On the other hand, when the mean grain size of the W powder is greater than 7.0 μm Cr can not be diffused into a center of each W particle, which gives rise to an inhomogeneous metallographic structure in the cemented carbide.

As mentioned above, the heating rate is restricted to the range between 3 and 100° C./minutes. In the meanwhile, the Cr carbide and the WC can not form a solid solution, as known in the art. Under the circumstances, when the heating rate exceeds 100° C./minutes, a reaction between the W powder and the C powder quickly proceeds. Such a quick reaction makes growth of the fine primary crystal WC particles insufficient. On the other hand, when the heating rate is less than 3° C./minute, a growth of W particles objectionably occurs.

In addition, an amount of chromium carbide is restricted to a range between 0.2 and 2.5% by weight. The amount less than 0.2% is not enough to diffuse chromium into each grain of tungsten and to form diffusion phases in tungsten particle and thereby fine polycrystalline primary particles. As a result, an intermingled condition is formed by coexistence of fine particles diffused by chromium with coarse particles which are not diffused by chromium. Therefore, fine and homogeneous composite powder can not be formed due to lack of chromium. Herein, it is to be noted that the fine primary particles of WC are liable to occur as the amount of chromium carbide increases. However, the amount of chromium carbide which is more than 2.5% by weight exceeds a limit of solid solution in the cemented carbide and gives rise to deposition of a phase which is weak in strength and which makes the alloy fragile. This is because a superfluous amount of chromium is left among the cemented carbide.

Furthermore, a total amount of vanadium carbide, tantalum carbide, molybdenum carbide, niobium carbide, and zirconium carbide which may be referred to as the additional powder, as mentioned above falls within a range between 0.1 and 3.0% by weight. When the total amount of additional powder is 0.1% or less, such an amount of addition makes it insufficient to form a diffusion phase and suppress the growth of particles which is caused to occur during a step of sintering the cemented carbide. Consequently, the fine grains can not be obtained. When the total amount of the additional powder is more than 3.0% by weight, another phase is deposited in the cemented carbide because the limit of the solid solution is exceeded. Such a phase is weak in strength and is reduced in toughness.

The half-value width of the X-ray diffraction method and the grain size measured by the FSSS method are limited as follows.

Herein, it is assumed that, in the X-ray diffraction of the tungsten carbide, the half-value width of (211) crystal planes in tungsten carbide (JCPDS card 25-1047, d=0.9020) is represented by Y and the grain size measured by the FSSS method is represented by X. Taking a relationship between X and Y into consideration, an inequality of $Y>0.61-0.33 \log(X)$ holds between X and Y. When the inequality does not hold, it has been found out that the WC crystal has a half value width which is small in comparison with the grain size measured by the FSSS method. This shows that the primary crystal of WC has a coarse particle size and makes it difficult to produce a cemented carbide with a fine and uniform grain size.

Next, description will be made as regards first through thirteenth samples according to the embodiment of the present invention.

In the samples, the composite carbide powder is assumed to be used for powder metallurgy and contains fine primary crystal particles of tungsten carbide after it is subjected to a process according to the present invention.

TABLE 1

| Sample No. | Grain Size of W (μm) | C Powder (wt %) | Addition of chromium | (wt %) | Additive 1 | (wt %) | Additive 2 | (wt %) | Heating Rate (° C./min) | Temperature (° C.) | Treatment Time (min) | Atmosphere |
|---|---|---|---|---|---|---|---|---|---|---|---|---|
| 1 | 1.5 | 6.5 | chromium oxide | 0.4 | — | — | — | — | 100 | 1250 | 20 | $H_2$ |
| 2 | 1.7 | 6.5 | chromium oxide | 0.7 | — | — | — | — | 50 | 1450 | 30 | Ar |
| 3 | 1.5 | 6.3 | chromium oxide | | tantalum carbide | 2.0 | — | — | 3 | 1400 | 120 | vacuum |
| 4 | 3.3 | 6.5 | chromium oxide | 1.8 | — | — | — | — | 50 | 1550 | 30 | $H_2$ |
| 5 | 6.4 | 6.7 | chromium oxide | 1.8 | vanadium pentoxide | 0.6 | — | — | 50 | 1450 | 30 | $H_2$ |
| 6 | 5.8 | 7.0 | chromium oxide | 2.5 | — | — | — | — | 8 | 1500 | 180 | vacuum |
| 7 | 2.0 | 6.6 | chromium oxide | 1.5 | vanadium pentoxide | 0.6 | — | — | 50 | 1450 | 30 | $H_2$ |
| 8 | 1.5 | 6.7 | chromium nitrate | 6.0 | zirconium carbide | 1.0 | — | — | 10 | 1500 | 180 | vacuum |
| 9 | 3.5 | 6.5 | chromium oxide | 1.4 | molybdenum | 3.0 | — | — | 15 | 1500 | 250 | vacuum |
| 10 | 1.0 | 7.0 | chromium | 6.0 | niobium | 1.0 | tantalum | 1.5 | 50 | 1700 | 30 | $H_2$ |

TABLE 1-continued

| Sample No. | Grain Size of W (μm) | C Powder (wt %) | Addition of chromium | (wt %) | Additive 1 | (wt %) | Additive 2 | (wt %) | Heating Rate (° C./min) | Temperature (° C.) | Treatment Time (min) | Atmosphere |
|---|---|---|---|---|---|---|---|---|---|---|---|---|
| 11 | 2.0 | 6.5 | hexacarbonyl chromium oxide | 1.8 | pentoxide — | — | carbide — | — | 50 | 1500 | 30 | N$_2$ |
| 12 | 1.8 | 6.2 | metal chromium | 1.5 | vanadium carbide | 0.5 | — | — | 50 | 1400 | 30 | H$_2$ |
| 13 | 1.4 | 6.2 | chromium carbide | 1.2 | tantalum carbide | 1.0 | — | — | 5 | 1450 | 200 | vacuum |

TABLE 2

| | Characteristics of carbide | | | | Characteristic of 10% Co cemented carbide | | |
|---|---|---|---|---|---|---|---|
| Sample No. | Mean Grain Size of WC (μm) | Total carbon (%) | Half-value width (°) | Fe (%) | Mean Grain Size of WC (μm) | Transverse Rapture Strength (kg/mm$^2$) | Hardness (HRA) |
| 1 | 1.6 | 6.19 | 0.70 | 0.009 | 0.7 | 410 | 92.5 |
| 2 | 1.8 | 6.12 | 0.68 | 0.007 | 0.8 | 390 | 92.4 |
| 3 | 1.6 | 6.15 | 0.67 | 0.007 | 0.6 | 368 | 92.9 |
| 4 | 2.8 | 6.08 | 0.70 | 0.005 | 0.6 | 392 | 92.9 |
| 5 | 5.4 | 6.11 | 0.67 | 0.006 | 0.4 | 405 | 93.3 |
| 6 | 7.0 | 6.42 | 0.55 | 0.004 | 0.7 | 340 | 92.7 |
| 7 | 1.8 | 6.25 | 0.72 | 0.006 | 0.4 | 405 | 93.5 |
| 8 | 1.4 | 5.78 | 0.63 | 0.013 | 0.6 | 355 | 93.0 |
| 9 | 2.9 | 6.16 | 0.64 | 0.008 | 0.6 | 398 | 92.9 |
| 10 | 1.0 | 6.09 | 0.68 | 0.009 | 0.6 | 363 | 93.1 |
| 11 | 1.7 | 6.20 | 0.59 | 0.006 | 0.6 | 400 | 93.0 |
| 12 | 1.9 | 6.21 | 0.56 | 0.007 | 0.7 | 372 | 92.6 |
| 13 | 1.2 | 6.18 | 0.59 | 0.009 | 0.6 | 393 | 92.9 |

In Table 1, each of the samples are prepared as raw powder and includes a mixture of the tungsten (W) powder, the carbon (C) powder, the chromium (Cr) powder, and the additional powder selected from the group consisting of Ta, V, Mo, Nb, and Zr. As shown in Table 1, the tungsten (W) powder has a grain size between 1.0 and 6.4 μm and is not smaller than 1.0 μm before it is mixed with the other components. The chromium powder may be added in the form of metal chromium, chromium oxide, inorganic chromium compound, organic chromium compound, or chromium carbide. The mixture is mixed with a Henschell mixer (product name) for 30 minutes.

Under the conditions shown in Table 1, the samples are carburized to obtain the WC powder including fine primary grains of WC and all exhibit characteristics as shown in Table 2. As readily understood from Table 2, the grain size of the WC powder processed in the above-mentioned method falls within a range between 1.0 and 7.0 μm and is somewhat different from the grain size of the tungsten (W) powder shown in Table 1.

In this case, 10% of Co powder by weight is mixed with each WC powder. In addition, C powder is also added so as to adjust a carbon content to an optimum two-phase region. Under the circumstances, the mixture mentioned above is completely mixed for 10 hours in a wet atmosphere by the use of an Attoritor (product name).

Each of the mixtures is dried and pressed at a pressure of 1 ton/cm$^2$ to form a compact block. Thereafter, each compact block is sintered at 1400° C. for 60 minutes and subjected to a hot-isostatic-pressing (HIP) process at a temperature of 1350° C. in an Ar atmosphere kept at 1000 atm. to form an HIP material. Each of the metallographic structures of HIP materials is observed about a grain size of the WC phase by the use of a scanning electron microscope (SEM) at a magnification of 10000. Furthermore, characteristics of transverse rapture strength and hardness are measured in connection with each HIP material. The results of the measurement are also shown in Table 2.

As shown in Tables 1 and 2, first through thirteenth ones of the samples have the transverse rapture strength and the hardness (HRA) which are not lower than those of tungsten carbide materials produced by the use of tungsten carbide of fine grain sizes less than 1 μm.

The characteristics of HIP materials of the samples of the present invention are shown in Table 2. From Table 2, it is understood that each composite carbide powder according to the first through the thirteenth samples is specified by the inequality of:

$$Y > 0.61 - 0.33 \log (X),$$

wherein Y denotes a half-value width of (211) crystal planes in tungsten carbide which are measured by an X-ray diffraction method and X denotes a grain size measured by the FSSS method. In any event, the composite carbide powders have fine primary WC crystal particles or grains which diffuse Cr, V, Ta, Mo, Nb, or Zr components into WC particles.

On the other hand, it is confirmed that each of conventional samples that has been produced by the use of a fine grain has a small half-value width less than 0.50° even when the fine grain size of the WC is used. As a result, the inequality mentioned above can not be satisfied in the conventional samples. This shows that the conventional samples which as a mean grain size not smaller than 1 μm are represented by Y<0.61–0.33 log (X).

As mentioned above, each of the composite carbide powders of the present invention is specified by the relationship between the half-value width Y and the grain size X measured by the FSSS method and is specifically given by the inequality of Y>0.61–0.33 log (X). From this fact, it is concluded that each of the cemented carbide made of the composite carbide powder has a homogeneous grain size, a high hardness, and a high strength in comparison with the conventional samples produced by tungsten carbide of fine grain sizes less than 1 μm.

What is claimed is:

1. A method of producing a composite carbide powder having tungsten carbide powder as a main element, the method comprising the steps of:

preparing tungsten powder which has a mean grain size not smaller than 1 micron meter;

mixing the tungsten powder with carbon powder and chromium powder of 0.2 to 2.5% by weight into a mixture; and diffusing chromium of the mixture into the tungsten powder in an atmosphere of hydrogen, a vacuum or an inert gas to form, as the composite carbide powder, fine primary crystal particles of the tungsten carbide which are divided by boundaries of chromium.

2. A method as claimed in claim 1, wherein the tungsten powder has the mean grain size between 1 and 7 $\mu$m.

3. A method as claimed in claim 1, wherein the chromium powder is selected from the group consisting of metal chromium, inorganic chromium compound, and organic chromium compound.

4. A method as claimed in claim 1, wherein the inert gas atmosphere is argon or nitrogen atmosphere.

5. A method as claimed in claim 1, wherein the composite carbide powder comprises fine primary crystal particles of tungsten carbide which satisfies an inequality given by:

$$Y > 0.61 - 0.33 \log (X),$$

where Y denotes a half-value width of (211) crystal planes in tungsten carbide (JCPDS-card 25-1047, d=0.9020) measured by an X-ray diffraction and where X denotes a grain size measured by a FSSS method.

6. A method as claimed in claim 1, wherein the diffusing step comprises the steps of:

heating the mixture in the inert atmosphere at a heating rate between 3 and 100° C./min to a temperature between 1,200 and 1,700° C.; and holding the mixture at the temperature for a time interval between 10 and 300 minutes.

7. A method of producing a composite carbide powder having tungsten carbide powder as a main element, the method comprising the steps of:

preparing tungsten powder which has a mean grain size not smaller than 1 micron meter;

mixing the tungsten powder with carbon powder, chromium powder of 0.2 to 2.5% by weight and 0.1 to 3.0% of at least one carbide component selected from the group consisting of vanadium carbide, tantalum carbide, molybdenum carbide, niobium carbide and zirconium carbide, into a mixture; and diffusing chromium of the mixture into the tungsten powder in an atmosphere of hydrogen, a vacuum or an inert gas to form, as the composite carbide powder, fine primary crystal particles of the tungsten carbide which are divided by boundaries of chromium.

8. A method of producing a composite carbide powder having tungsten carbide powder as a main element, the composite carbide powder containing 0.2 to 2.5% by weight chromium carbide, the method comprising the steps of:

mixing tungsten particles having a particle size no smaller than 1 $\mu$m, carbon and a chromium powder to form a mixture;

raising the mixture to a temperature in the range of 1,200 to 1,700° C. at a rate between 3 to 100° C./min; and heating the mixture at a defined temperature in the range of 1,200 to 1,700° C. for 10 to 300 minutes in a hydrogen, vacuum or inert atmosphere.

9. A method as claimed in claim 8, wherein the tungsten powder has a mean grain size between 1 and 7 $\mu$m.

10. A method as claimed in claim 8, wherein the heating is conducted in an inert atmosphere.

11. A method as claimed in claim 10, wherein heating is conducted in an inert atmosphere selected from the group consisting of argon or nitrogen.

12. A method as claimed in claim 8, wherein the composite carbide powder comprises fine primary crystal particles of tungsten carbide which satisfies an inequality given by:

$$Y > 0.61 - 0.33 \log (X),$$

where Y denotes a half-value width of (211) crystal planes in tungsten carbide (JCPDS-card 25-1047, d=0.9020) measured by an X-ray diffraction and where X denotes a grain size measured by a FSSS method.

13. A method as claimed in claim 8, wherein the mixing step comprises mixing the tungsten powder with carbon powder and chromium powder together with 0.1 to 3.0% by weight additional oxide or carbide powder of at least one component selected from the group consisting of Ta, Mo, Nb, and Zr.

14. A composite carbide powder comprising, as a main component, tungsten carbide powder which comprises fine primary crystal particles of tungsten carbide formed by diffusing, by weight, 0.2 to 2.5% of chromium carbide, wherein said tungsten carbide powder satisfies an inequality given by:

$$Y > 0.61 - 0.33 \log (X),$$

where Y denotes a half-value width of (211) crystal planes in the tungsten carbide (JCPDS-card 25-1047, d=0.9020) measured by a X-ray diffraction method and where X denotes a grain size measured by a FSSS method;

the grain size X of the tungsten carbide being not smaller than 1.0 micron meter.

15. A composite carbide powder as claimed in claim 14, wherein the fine primary crystal particles further comprise, by weight, 0.1 to 3.0% of at least one carbide component selected from a group consisting of vanadium carbide, tantalum carbide, molybdenum carbide, niobium carbide and zirconium carbide.

* * * * *